US011139681B2

(12) United States Patent
Northway et al.

(10) Patent No.: US 11,139,681 B2
(45) Date of Patent: Oct. 5, 2021

(54) SMART SWITCHING PANEL FOR SECONDARY POWER SUPPLY

(71) Applicant: Briggs & Stratton, LLC, Wauwatosa, WI (US)

(72) Inventors: Brian Northway, Hartford, WI (US); Michael A. Miller, Lake Mills, WI (US)

(73) Assignee: Briggs & Stratton, LLC, Wauwatosa, WI (US)

( * ) Notice: Subject to any disclaimer, the term of this patent is extended or adjusted under 35 U.S.C. 154(b) by 146 days.

(21) Appl. No.: 16/211,812

(22) Filed: Dec. 6, 2018

(65) Prior Publication Data

US 2019/0181679 A1   Jun. 13, 2019

Related U.S. Application Data

(60) Provisional application No. 62/596,450, filed on Dec. 8, 2017.

(51) Int. Cl.
| | |
|---|---|
| H02J 9/06 | (2006.01) |
| H02J 3/14 | (2006.01) |
| H02J 13/00 | (2006.01) |
| H02J 3/38 | (2006.01) |

(52) U.S. Cl.
CPC .............. *H02J 9/061* (2013.01); *H02J 3/14* (2013.01); *H02J 13/0006* (2013.01); *H02J 3/383* (2013.01); *H02J 9/068* (2020.01)

(58) Field of Classification Search
None
See application file for complete search history.

(56) References Cited

U.S. PATENT DOCUMENTS

| 10,014,713 | B1* | 7/2018 | Nguyen | H02J 9/061 |
| 10,250,041 | B2* | 4/2019 | Satake | H02J 3/387 |
| 2009/0063228 | A1* | 3/2009 | Forbes, Jr. | G06Q 30/0205 705/7.25 |
| 2011/0245988 | A1* | 10/2011 | Ingels | H02J 3/14 700/295 |
| 2012/0327563 | A1* | 12/2012 | Cook | H02J 4/00 361/624 |
| 2016/0094152 | A1* | 3/2016 | Geil | H02J 3/14 363/123 |
| 2019/0115175 | A1* | 4/2019 | Saito | H01H 47/002 |

* cited by examiner

*Primary Examiner* — Jared Fureman
*Assistant Examiner* — Joel Barnett
(74) *Attorney, Agent, or Firm* — Foley & Lardner LLP

(57) ABSTRACT

A smart switching panel for selectively connecting either a primary power supply or a secondary power supply to a plurality of electric loads. The switching panel includes a plurality of switching elements each connected to both the primary and secondary power supplies. A controller of the switching panel operates to cause the switching element to transition between a first position in which the primary power supply is connected to the electric load, a second position in which the secondary power supply is connected to the electric load and an open condition. A current sensor is positioned to monitor the amount of current drawn by the electric load and is connected to the controller such that the controller can monitor the amount of current drawn by each of the electric loads. The controller can transition each of the switching elements to the open condition when the current draw exceeds a current threshold.

18 Claims, 3 Drawing Sheets

SMART SWITCHING PANEL FOR SECONDARY POWER SUPPLY

CROSS REFERENCE TO RELATED APPLICATION

The present application is based on and claims priority to U.S. Provisional Patent Application Ser. No. 62/596,450, filed Dec. 8, 2017, the disclosure of which is incorporated herein by reference.

BACKGROUND

The present disclosure generally relates to a switching panel for use with a primary power supply and a secondary power supply. More specifically, the present disclosure relates to a smart switching panel that allows each of a plurality of electric loads to be selectively and separately switched between a primary power supply and a secondary power supply.

Presently, many different types of secondary power supplies are being utilized at a home or small business level to provide either an alternative to the utility power supply or to provide back up power upon a loss of the primary, utility power supply. These different types of secondary power supplies are designed to replace the utility power supply upon power loss or to replace the utility power supply to reduce the cost of energy consumption at the home or business.

Secondary power supplies can come in many different forms. For example, the secondary power supply could be a backup generator that runs on a gas supply, a grid of solar panels, a wind turbine or a bank of rechargeable electric storage batteries. The rechargeable electric storage batteries are typically charged by the utility power supply but could be charged by a wind turbine or a grid of solar panels. In each case, some type of switching panel or transfer switch panel is used to transfer the source of power feeding multiple electric loads from the primary, utility power supply to the secondary power supply. The transfer switching panel typically transfers power from the primary power supply to the secondary power supply for a plurality of electric loads that are designated as essential loads. Such a transfer switch allows for the continuous supply of power to the essential loads upon an interruption to the primary power supply. Although this type of system functions well to provide continuous power to the essential loads, the currently available transfer switch panels underutilize the available power from the secondary power supply.

Therefore, a need exists for an improved switching panel to maximize the usage of the available secondary power supply. The present disclosure recognizes the under utilization of the secondary power supply and provides a system and method that is able to utilize the power available from one or more secondary power supplies both during power interruption from the primary power supply and when the primary power supply is available.

SUMMARY

The present disclosure relates to a smart switching panel for use with a plurality of electric loads. The smart switching panel includes a plurality of individual switching elements that each are connected to a primary power supply and a secondary power supply. Each of the switching elements is connected to at least one electric load and can be transitioned between first and second conditions. In the first condition, electric power from the primary power supply is supplied to the electric load. In the second condition, electric power from the secondary power supply is supplied to the electric load.

A current sensor is positioned between the switching element and the electric load to monitor the amount of current drawn through the switching element by the loads connected to the switching element.

A controller is configured to receive information as to the amount of current draw by each load from the current sensor. The controller is connected to each of the switching elements through a control line to control the operative position of the switching element between the first position, the second position and an open position. In this manner, the controller can selectively connect either the primary power supply or the secondary power supply to each of the loads or disconnect the load from both power supplies to isolate the load. In an over current condition, the controller can transition the switching element to the open condition.

A user can monitor the operation of the smart switching system through the controller. The user can select the condition of each of the switching elements to selectively control whether the primary power supply or the secondary power supply is used to drive the individual electric loads. The controller can be accessed either directly or through a wireless network. The controller can also be operated in an automatic mode to select which of the primary and secondary power supplies is connected to each of the loads. This determination can be based on many different variables, including the cost of electricity and the state of the secondary power supply.

Various other features, objects and advantages of the invention will be made apparent from the following description taken together with the drawings.

BRIEF DESCRIPTION OF THE DRAWINGS

The drawings illustrate the best mode presently contemplated of carrying out the disclosure. In the drawings.

DETAILED DESCRIPTION

Figure 1:
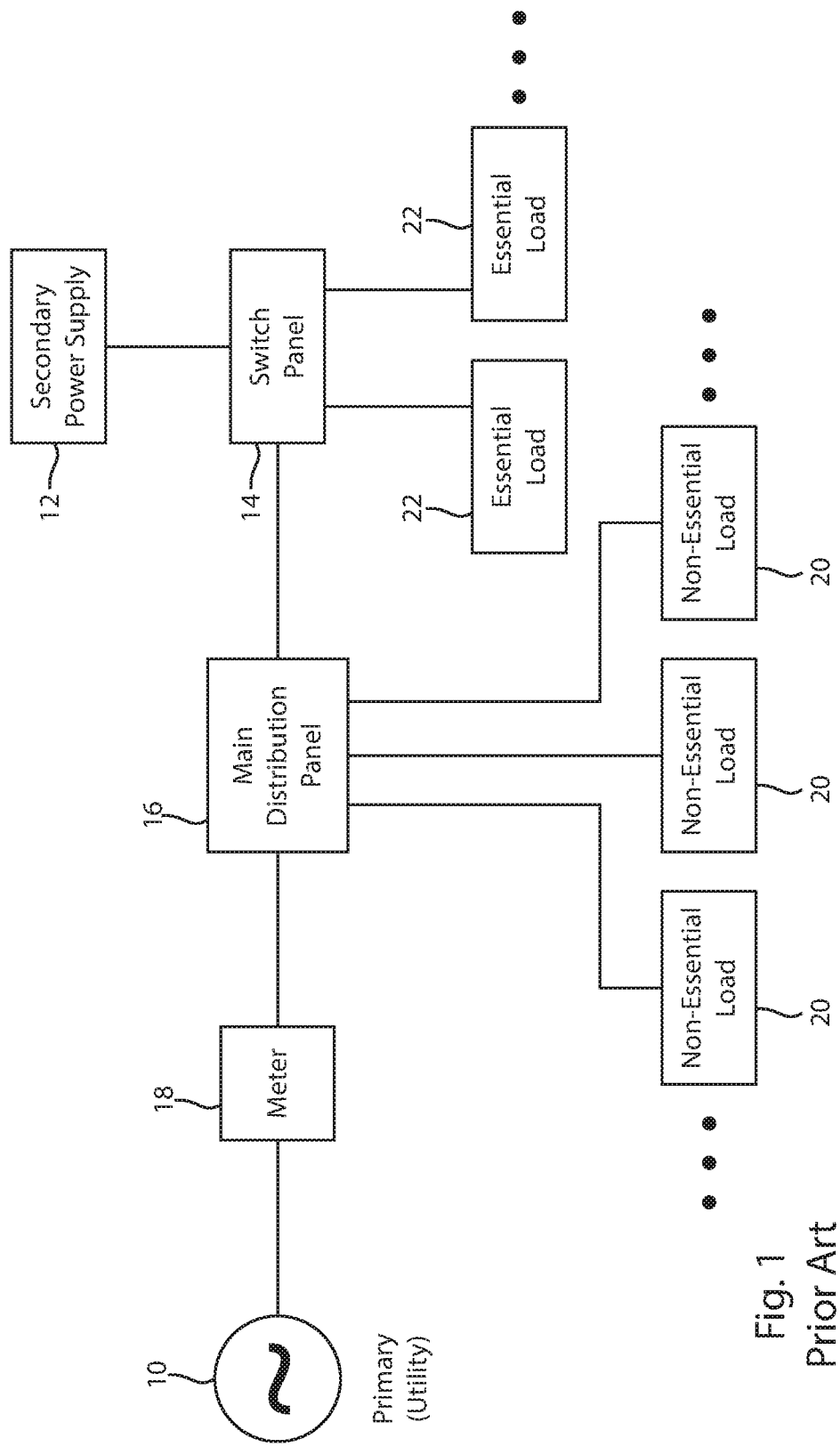
FIG. 1 is a schematic illustration of a prior art switching system.

FIG. 1 illustrates a prior art configuration for switching between a primary power supply 10 and a secondary power supply 12. In the embodiment shown in FIG. 1, the primary power supply 10 is a utility that provides a source of electric power through a conventional electric grid. The terms primary power supply and utility power supply will be used interchangeably throughout the present disclosure.

The secondary power supply 12 can be one of multiple different types of power supply systems capable of providing electric power to operate various different electric loads within a home or small business. It is contemplated that the secondary power supply 12 could be a standby generator operated off of a supply of gas, a photovoltaic generator that includes a series of separate solar cells, one or more electric storage batteries, a wind turbine or any other type of power supply that is capable of generating sufficient electric power to operate and drive electric loads.

In the embodiment shown in FIG. 1, the secondary power supply 12 is connected to a transfer switch panel 14 while the primary power supply 10 is connected to a main distribution panel 16 through an electricity meter 18. As is well known, the electricity meter 18 monitors and measures the amount of electric power drawn by electric loads through the main distribution panel 16. The main distribution panel 16 includes a series of individual circuit breakers (not shown) that control the flow of electricity to one or more loads connected to the circuit breaker. In the embodiment shown in FIG. 1, a plurality of non-essential loads 20 are connected to the individual circuit breakers contained within the main distribution panel 16. The non-essential loads 20 can be electric loads or switching circuits within a home that are connected to non-essential devices or circuits in a home, such as televisions, lighting, electrical outlets and other electric loads within the home that may not be needed upon a power failure. When the primary power supply 10 is interrupted, such as through a utility shutdown or interruption due to storms or other types of unexpected conditions, the electric loads designated as non-essential will not be available upon activation of the secondary power supply 12.

As illustrated in FIG. 1, a number of essential loads 22 are connected to the transfer switch panel 14. During normal operation of the primary power supply 10, the switching elements in the transfer switch panel 14 allows electric power from the utility power source 10 to flow through the individual switching elements within the transfer switch panel 14 to power the essential loads 22. If the primary power supply 10 is operating normally, each of the essential loads 22, along with the non-essential loads 20, will be powered by the primary power supply 10. However, when the primary power supply 10 is interrupted, the transfer switch panel 14 senses such interruption and adjusts the position of the individual switches within the transfer switch panel such that electric power from the secondary power supply 12 is provided to the essential loads 22 through the transfer switch panel 14. In some embodiments, the transfer switch panel 14 will initiate operation of the secondary power supply 12, such as a standby generator, before transitioning the connection to the secondary power supply. In this manner, when the primary power supply 10 is interrupted, power is not interrupted to the essential loads 22.

When the primary power supply 10 again comes online, the transfer switch panel 14 senses this condition and again adjusts the position of the switching elements contained within the transfer switch panel 14 such that power is supplied to the essential loads 22 from the primary power supply 10 rather than the secondary power supply 12. The transfer switch panel 14 may then turn off operation of the secondary power supply 12, such as the standby generator.

As can be understood in FIG. 1, the transfer switch panel 14 functions to provide electric power to all of the essential loads 22 from either the primary power supply 10 or the secondary power supply 12. The switching elements contained within the transfer switch panel 14 are configured such that power is supplied to the essential loads 22 from either one of the two power sources, but never both.

Figure 2:
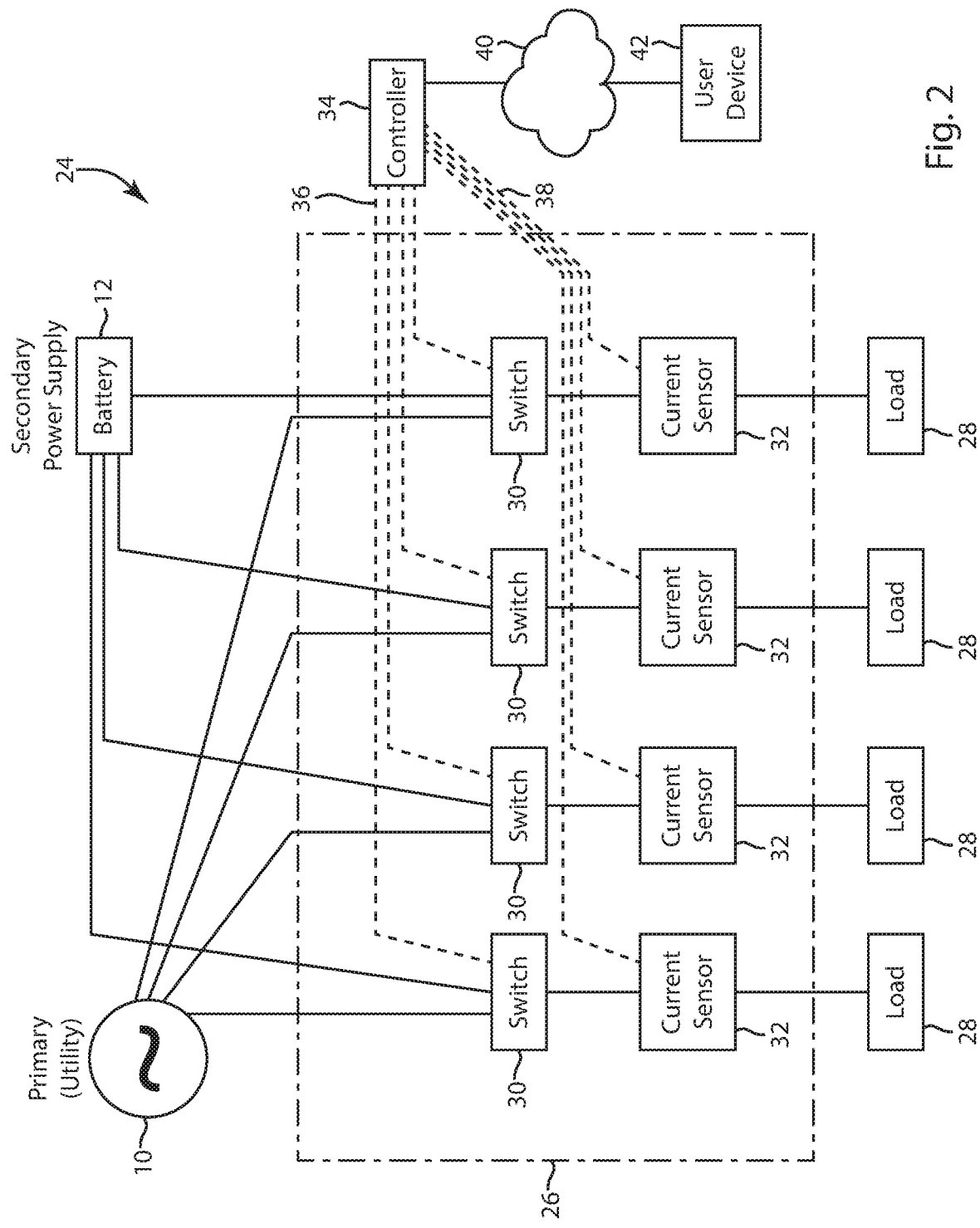
FIG. 2 is a schematic illustration of the smart switching system and smart switching panel of the present disclosure for switching between the primary and secondary power supplies.

FIG. 2 illustrates an improved power supply switching system 24 constructed in accordance with the present disclosure. As with the embodiment shown in FIG. 1, the switching system 24 includes a primary power supply 10 and at least one secondary power supply 12. However, unlike the system shown in FIG. 1, the smart switching system 24 utilizes a smart switching panel 26 to selectively control which of the two power supplies 10, 12 are used to power the electric loads 28. In the embodiment shown in FIG. 2, the electric loads 28 are not classified as non-essential loads or essential loads as was the case in FIG. 1.

The smart switching panel 26 includes a plurality of switching elements 30 that are each connected to both the primary power supply 10 and the secondary power supply 12. It is contemplated that the switching panel 26 could include up to forty separate switching elements 30 where each of the separate switching elements 30 would control the supply of electric power to connected electric loads 28 or electric circuits. However, configurations having more than forty switching elements or fewer than forty switching elements are also contemplated. Although a single load 28 is shown in FIG. 2 as connected to each of the switching elements 30, the load 28 could represent multiple devices, one or more electric circuits or just a single device. Each of the switching elements 30 provides electric power to the electric load 28 through a current sensor 32. The current sensor 32 monitors the current drawn by the associated electric load 28. It is contemplated that the combination of the switching element 30 and current sensor 32 would provide a similar function to a circuit breaker which it will replace.

Each of the switching elements 30 and current sensors 32 are connected to a controller 34. The controller 34 can be located either within the smart switching panel 26 or in a location near the smart switching panel 26 such that the controller 34 can control the position of the switching elements 30 and receive current sensing information from each of the plurality of current sensors 32. The controller 34 can be one of any of a wide variety of controllers, such as a microprocessor, that is able to receive information from the current sensors 32 and generate control signals to each of the switching elements 30.

The switching elements 30 can be one of a wide variety of electric switching elements. It is contemplated that each of the switching elements 30 could be a MOSFET whose operative position is controlled by a control signal from the controller 34 through one of the control lines 36. Alternatively, the switching element 30 could be an insulated-gate bipolar transistor (IGBT), which is a three-terminal power semiconductor device. In other implementations, the switching element could be a multi-position relay or any other type of switching device whose position can be controlled through signals from the controller 34.

When the controller 34 receives a current measurement along one of the sensing lines 38 that exceeds the threshold rating, the controller 34 will generate a signal to the switching element 30 to move the switching element to an open position. The controller 34 can be configured to provide an alert indicating to the home owner that the current draw exceeded the current threshold. The alert could be a visual signal, an electronic message or any other type of alert that can be received by a home owner. In this manner, the switching element 30 will function as an enhanced circuit breaking element that can notify the home owner of the over current condition and can indicate which electric device cause such over current.

As can be understood by the configuration shown in FIG. 2, each of the switching elements 30 is able to selectively supply power from either the primary power supply 10 or the secondary power supply 12 to the electric load 28 connected thereto. The position of the switching elements 30 is controlled independently and separately from the other switching elements 30. Thus, if one of the loads 28 is consuming only a very small supply of electricity, the controller 34 may elect to provide the electricity to the load from the secondary power supply 12. Large power consuming devices, such as air conditioners, may at the same time be connected to the primary power supply 10.

If the controller 34 receives information through the wireless network 40 that the cost of electricity from the primary power supply 10 is very high (e.g. exceeds a predetermined threshold), the controller 34 can selectively switch one or multiple switching elements 30 to supply electricity to selected loads 28 from the secondary power supply 12. Conversely, if the cost of electricity is very low, some or all of the loads may be connected to the primary power supply 10. In this manner, the controller 34 can selectively connect some of the electric loads 28 to the secondary power supply 12 while connecting other electric loads 28 to the primary power supply 10. Unlike past embodiments shown in FIG. 1, the smart switching panel 26 shown in FIG. 2 can selectively control the connection of the electric loads 28 to either the primary power supply 10 or the secondary power supply 12 based upon a variety of conditions, including the cost of electricity, the availability of the secondary power supply 12 or a wide variety of other conditions. This ability capitalizes on the presence of the secondary power supply rather than just using the secondary power supply 12 when the primary power supply 10 is not available.

In the embodiment shown in FIG. 2, the smart switching panel 26 could include forty or more separate switching elements 30, each of which would be connected to one or more electric loads 28. It is contemplated that more than one electric load or electric circuit 28 could be connected to each switching element 30. As an example, low power-consuming electric loads and electric circuits could be grouped together for each of the switching elements 30 while large power-consuming loads, such as an air conditioner, would be connected to a separate switching element 30 (e.g. would be the only load on a switching circuit).

As illustrated in FIG. 2, a user device 42 can be connected to the controller 34 through the wireless network 40. The wireless network 40 could be either a short-range wireless network or could be a global network, such as the internet. Through this connection, the user device 42 would be able to both dictate the operation of the controller 34 and monitor the electricity consumption by each of the individual loads 28 monitored by the series of individual current sensors 32. Over current situations that cause any of the switching elements 30 to open would also be reported on the user device 42. It is contemplated that the identity of the electric device that caused the over current situation to occur could also be reported to the user. In some embodiments, the user may be able to set electricity rate thresholds using the user device 42. For example, the user may set a price per kilowatt hour, that when exceeded, would cause the controller to switch more loads to the secondary power supply 12.

In some embodiments, the user may have three or more power sources. The controller may be configured to utilize each power source to power the electrical loads 28 based on a cost of each power source. For example, a first power source may have a cost of $1.00 per kw/h, a second power source may have a cost of $0.50 per kw/h and a third power source may have a cost of $0.25 per kw/h. The controller 34 may be configured to first power as many loads as possible using the third power source, then power as many remaining loads as possible with the second power sources, and finally power the remaining loads with the first power source. In some embodiments, such as where one of the power sources is a utility power source, the controller 34 may be configured to sell extra energy from one or more of the other power sources to offset the cost of powering the loads. In some embodiments, the controller 34 may have real time access to energy costs for each of the loads, allowing the controller 34 to modify the power source powering each of the loads in real time to maximize cost savings for the user. Further, the controller 34 may be configured to communicate with the utility, such that the controller can utilize one or more other power sources (e.g. second or third power sources) at different times of the day to reduce the burden on the utility grid. In some instances, the utility may provide additional discounted rates to the user if they can reduce energy being purchased from the grid at certain times of the day.

Figure 3:
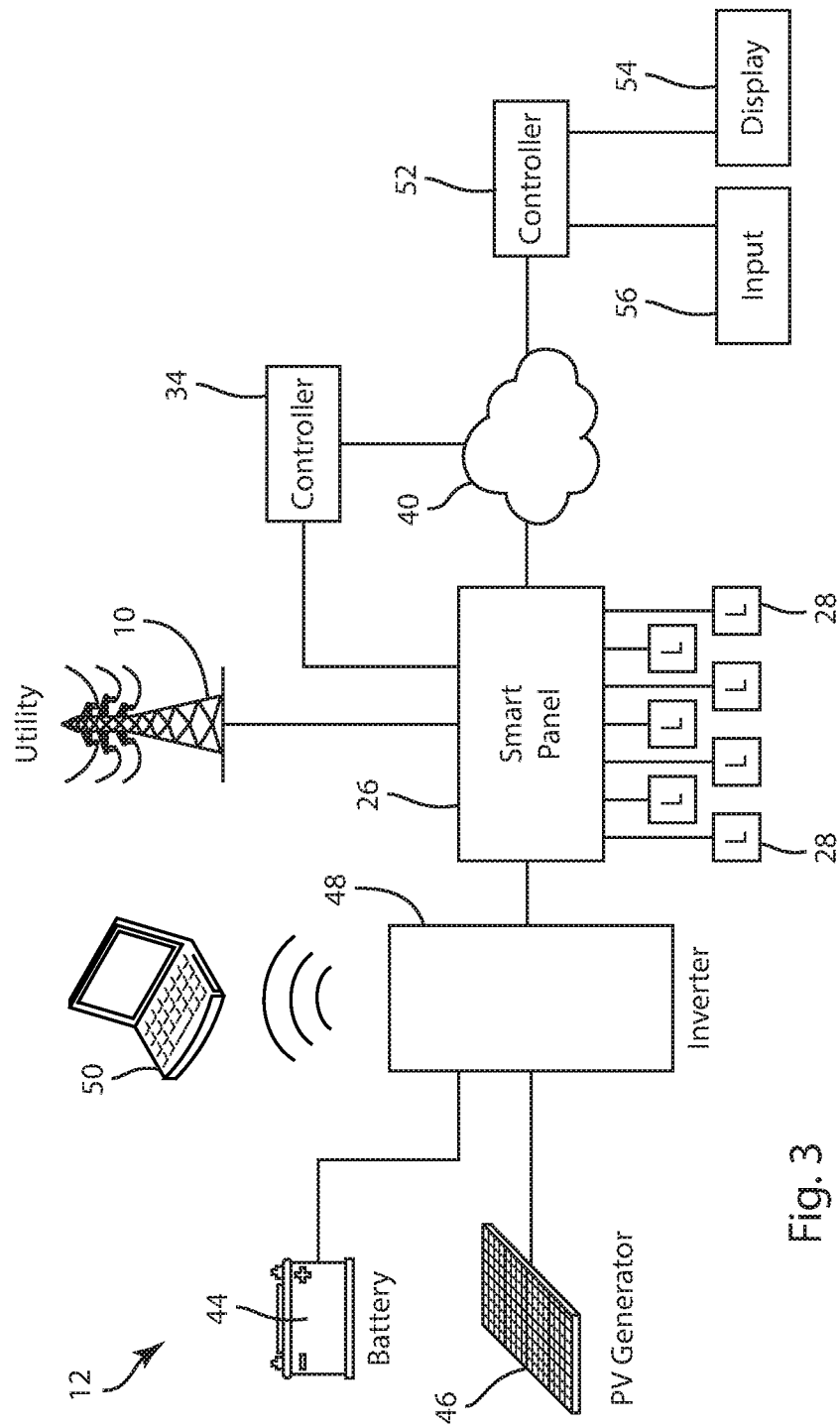
FIG. 3 is a second schematic illustration showing the connections between the secondary power supplies and the individual loads in a home

FIG. 3 further illustrates the configuration of the secondary power supply 12. In the embodiment shown in FIG. 3, the secondary power supply could be an electric storage battery array 44 or a photovoltaic generator 46 that includes a plurality of solar cells. Although the embodiment shown in FIG. 3 illustrates two separate secondary power supplies, it is contemplated that the secondary power supply could be comprised of one or the other of the two types of sources shown.

Each of the secondary power supplies 12 would be connected to a DC-AC inverter 48 that converts the DC voltage source to an AC voltage source that would then be supplied to the smart switching panel 26. The operation of the inverter 48 could be monitored wirelessly from a control terminal 50. The inverter 48 functions not only to convert the DC voltage source to an AC voltage source, but also to monitor the operation and status of both types of secondary power supplies, including the electric storage batteries 44 and photovoltaic generator 46.

As discussed previously, a controller 34 can be in direct communication with the smart switching panel 26. Alternatively, or in combination, a second controller 52 could be used to control the smart switching panel 26 through the wireless network 40. The remotely located controller 52 would thus allow a user or utility the ability to control the connection of either the secondary power supply 12 or the primary power supply 10 to each of the plurality of electric loads 28. It is contemplated that the controller 52 could include a visual display 54 and an input device 56 that would allow the user to both monitor the current operation of the smart panel 26 and modify the operation through the input device 56. The combination of the controller 52, display 54 and input device 56 could exist in a single unit, such as a smartphone or tablet computer.

As can be understood in the drawing figures and the above description, the smart switching panel 26 allows for the operation of one or more of the electric loads 28 from the secondary power supply 12 even when the primary power supply 10 is available. Unlike the prior art system shown in FIG. 1, the smart switching panel 26 can switch the supply of electricity from either the primary power supply 10 or secondary power supply 12 to individual loads at any time when both the primary power supply 10 and the secondary power supply 12 are available.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. A switching panel for providing electrical power to a plurality of electric loads from a primary power supply or a secondary power supply, comprising:
a plurality of switching elements each connected to both the primary power supply and the secondary power supply and to one of the electric loads, wherein each of the plurality of switching elements is operable in a first condition, a second condition and an open condition;
a controller operatively connected to each of the plurality of switching elements, wherein the controller is operable to independently control the condition of each of the switching elements; and
a plurality of current sensors each in communication with the controller, wherein each of the current sensors is positioned between one of the switching elements and the electric load associated with the switching element, wherein each of the plurality of current sensors is operable to detect a current draw of the electric load;
wherein the primary power supply is a utility power supply and the secondary power supply is a generator, the primary power supply and secondary power supply being configured to supply power to the switching panel simultaneously;
wherein each of the plurality of switching elements is configured to transition to the open condition upon receiving an indication from a corresponding one of the current sensors that a sensed current downstream of the switching element has exceeded a first threshold current value; and
wherein the controller is configured to transition one or more of the plurality of switching elements from the first condition to the second condition upon receiving an indication that the detected current draw of the electric load associated with the switching element is below a second threshold current value.

2. The switching panel of claim 1 wherein each of the electric loads is connected to the primary power supply when the switching element is in the first condition, is connected to the secondary power supply when the switching element is in the second condition and is disconnected from both the primary power supply and the secondary power supply when the switching element is in the open condition.

3. The switching panel of claim 1 wherein the controller is separately connected to each of the plurality of switching elements by one of a plurality of control lines.

4. The switching panel of claim 1 wherein the controller is separately connected to each of the plurality of current sensors by one of a plurality of sensing lines.

5. The switching panel of claim 1 wherein each of the switching elements is a MOSFET.

6. The switching panel of claim 1 wherein each of the switching elements is an insulated-gate bipolar transistor.

7. The switching panel of claim 1 wherein each of the switching elements is a multi-position relay.

8. The switching panel of claim 1, wherein the plurality of switching elements includes at least forty switching elements.

9. A method of providing electrical power to a plurality of electric loads from either a primary power supply or a secondary power supply comprising the steps of:
positioning a plurality of switching elements between the primary power supply and the secondary power supply and one of the electric loads, the switching elements being operable in a first condition to connect the primary power supply to the electric load, a second condition to connect the secondary power supply to the electric load and an open condition in which the electric load is disconnected from both the primary power supply and the secondary power supply;
positioning a current sensor between each of the switching elements and the electric load, the current sensor being operable to detect the current drawn by operation of the electric load;
connecting a controller to each of the switching elements and to each of the current sensors; and
operating the controller to independently control the condition of each of the switching elements to separately and selectively connect the plurality of electric loads to either the primary power supply or the secondary power supply;
wherein the primary power supply is a utility power supply and the secondary power supply is a generator, the primary power supply and secondary power supply being configured to supply power to the plurality of switching elements simultaneously;
wherein each of the plurality of switching elements is configured to transition to the open condition upon receiving an indication from a corresponding one of the current sensors that a sensed current downstream of the switching element has exceeded a first threshold current value; and
wherein the controller is configured to transition one or more of the plurality of switching elements from the first condition to the second condition upon receiving an indication that the detected current draw of the electric load associated with the switching element is below a second threshold current value.

10. The method of claim 9 wherein the controller is operable to selectively connect each of the electric loads to either the primary power supply or the secondary power supply.

11. The method of claim 10 further comprising the steps of:
receiving a connection request at the controller for a desired connection for one or more of the electric loads to either the primary power supply or the secondary power supply; and
operating the controller to control the condition of one or more of the switching elements to selectively connect the one or more electric loads to either the primary power supply or the secondary power supply based on the connection request.

12. The method of claim 11 wherein the connection request is received at the controller over a wireless network.

13. The method of claim 9 wherein the controller automatically controls the condition of one or more of the switching elements based on a real-time cost of power from the primary power supply.

14. The method of claim 9 wherein the controller automatically controls the condition of one or more switching elements based on the status of the secondary power supply.

15. A system of providing electric power to a plurality of electric loads, comprising:
a primary power supply;
a secondary power supply;
a plurality of switching element each connected to both the primary power supply and the secondary power supply and to one of the electric loads, wherein each of the plurality of switching elements is operable in a first condition to connect the electric load to the primary power supply, a second condition to connect the electric load to the secondary power supply and an open condition to disconnect the electric load from both the primary power supply and the secondary power supply;

a controller operatively connected to each of the plurality of switching elements, wherein the controller is operable to control the condition of each of the switching elements; and a plurality of current sensors each positioned between one of the switching elements and the electric load associated with the switching element, wherein each of the plurality of current sensors is connected to the controller, wherein the primary power supply can be connected to one or more of the electric loads at the same time the secondary power supply is connected to one or more of the electric loads;

wherein the primary power supply is a utility power supply and the secondary power supply is a generator, the primary power supply and secondary power supply being configured to supply power to the switching elements simultaneously;

wherein each of the plurality of switching elements is configured to transition to the open condition upon receiving an indication from a corresponding one of the current sensors that a sensed current downstream of the switching element has exceeded a first threshold current value; and wherein the controller is configured to transition one or more of the plurality of switching elements from the first condition to the second condition upon receiving an indication that the detected current draw of the electric load associated with the switching element is below a second threshold current value.

16. The system of claim 15 wherein the controller is connected to a wireless network to receive connection requests indicating the desired connection for one or more of the electric loads.

17. The system of claim 15 wherein the controller is operable to selectively and separately connect each of the electric loads to either the primary power supply or the secondary power supply based on operating parameter of the primary power supply and the secondary power supply.

18. The system of claim 15 wherein the plurality of switching elements, the plurality of current sensors and the controller are contained within an enclosure.

\* \* \* \* \*